(12) United States Patent
Liu et al.

(10) Patent No.: US 11,476,789 B1
(45) Date of Patent: Oct. 18, 2022

(54) SYSTEM OF DRIVING AND CONTROLLING MOTOR

(71) Applicant: ANPEC ELECTRONICS CORPORATION, Hsinchu (TW)

(72) Inventors: Yun-Li Liu, Hsinchu (TW); Wei-Chih Wang, Hsinchu (TW); Yuan-Hung Wang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/492,747

(22) Filed: Oct. 4, 2021

(30) Foreign Application Priority Data

Jun. 10, 2021 (TW) .................................. 110121087

(51) Int. Cl.
*H02P 27/08* (2006.01)
*H02P 7/28* (2016.01)
*H02P 7/29* (2016.01)

(52) U.S. Cl.
CPC ...... *H02P 27/085* (2013.01); *H02P 2207/055* (2013.01)

(58) Field of Classification Search
CPC .......... H02P 27/08; H02P 7/29; H02P 27/085; H02P 6/085; H02P 7/28
See application file for complete search history.

(56) References Cited

U.S. PATENT DOCUMENTS

| | | | | |
|---|---|---|---|---|
| 4,445,167 A | * | 4/1984 | Okado | H02M 5/458 363/56.02 |
| 5,909,098 A | * | 6/1999 | Konecny | H02P 27/08 318/811 |
| 5,932,979 A | * | 8/1999 | Sun | B66B 1/30 318/400.4 |
| 7,759,891 B2 | * | 7/2010 | Serizawa | H02H 5/044 318/434 |
| 2013/0249462 A1 | * | 9/2013 | Beichter | H02M 7/2176 318/504 |

* cited by examiner

*Primary Examiner* — Thai T Dinh
(74) *Attorney, Agent, or Firm* — Li & Cai Intellectual Property (USA) Office

(57) ABSTRACT

A system of driving and controlling a motor is provided. A main controller adjusts frequencies of all or some of pulse waves of an initial pulse width modulation signal to output a pulse width modulation signal according to instruction information. The adjusted frequency of each of the pulse waves is equal to a first preset frequency or a second preset frequency. When a motor driver drives the motor to stably rotate, the motor driver decodes each of the pulse waves having the first preset frequency into a first message and decodes each of the pulse waves having the second preset frequency into a second message. The motor driver arranges and combines all of the first messages and the second messages that are decoded from the pulse waves to obtain the instruction information. The motor driver executes an operation instructed by the instruction information.

15 Claims, 5 Drawing Sheets

SYSTEM OF DRIVING AND CONTROLLING MOTOR

CROSS-REFERENCE TO RELATED PATENT APPLICATION

This application claims the benefit of priority to Taiwan Patent Application No. 110121087, filed on Jun. 10, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a system of driving and controlling a motor.

BACKGROUND OF THE DISCLOSURE

With continuous development of various electronic products, motors have become important components of the electronic products. When a conventional main controller intends to control a motor driver to drive the motor, the conventional main controller outputs a pulse width modulation signal to the motor driver. Based on a duty cycle of the pulse width modulation signal, a driver circuit of the motor driver outputs a driving signal to the motor according to driving parameters stored in a register, so as to drive the motor to rotate normally. Therefore, a rotational speed of the motor depends on the duty cycle of the pulse width modulation signal.

However, when the motor controller intends to control the motor to run in different modes, the motor controller must output the pulse width modulation signal to the driver circuit, and the driver circuit needs to write new driving parameters of the motor into the register of the motor driver based on the duty cycle of the pulse width modulation signal. Under this condition, the driver circuit may mistakenly control the motor based on the duty cycle of the pulse width modulation signal of the new driving parameters. As a result, the motor rotates abnormally, which may cause a user to be injured.

For safety considerations, before the new driving parameters provided by the main controller are written into the register, a signal having a default time must be outputted to the motor, so as to stop a rotation of the motor. After the default time during which the register is updated elapses, the main controller outputs the pulse width modulation signal to the driver circuit. Based on the duty cycle of said pulse width modulation signal, the driver circuit drives the motor to rotate according to the new driving parameters of the motor.

SUMMARY OF THE DISCLOSURE

In response to the above-referenced technical inadequacies, the present disclosure provides a system of driving and controlling a motor, which is applicable to a motor. The system includes a main controller and a motor driver. The main controller is configured to output an initial pulse width modulation signal. The main controller generates or obtains a preset reference information from an additional circuit. A first preset frequency is preset to represent a first message and a second preset frequency is preset to represent a second message in the preset reference information. Based on an order of the pulse waves of the initial pulse width modulation signal and time points at which the pulse waves of the initial pulse width modulation signal appear respectively, the main controller adjusts frequencies of all or some of the plurality of pulse waves of the initial pulse width modulation signal according to instruction information that the main controller is to transmit. The frequency of each of the pulse waves that is adjusted is equal to the first preset frequency or the second preset frequency. The main controller outputs a pulse width modulation signal according to the initial pulse width modulation signal that is adjusted. The motor driver includes a driver circuit connected to the main controller and the motor. The driver circuit is configured to receive the pulse width modulation signal from the main controller. When the driver circuit drives the motor to stably rotate based on the initial pulse width modulation signal, the driver circuit decodes each of the pulse waves each having the first preset frequency into the first message based on the preset reference information, and the driver circuit decodes each of the pulse waves each having the second preset frequency into the second message based on the preset reference information. The driver circuit arranges and combines all of the first messages and the second messages that are decoded from the pulse waves to obtain the instruction information according to the order of the pulse waves of the pulse width modulation signal and the time points at which the pulse waves of the pulse width modulation signal appear respectively, and the driver circuit executes an operation instructed by the instruction information. The main controller does not adjust a duty cycle of each of the pulse waves according to the instruction information that the main controller is to transmit to the motor driver.

In certain embodiments, one of the first message and the second message is represented by a bit value "0", and another one of the first message and the second message is represented by a bit value "1".

In certain embodiments, the pulse waves of the pulse width modulation signal include a plurality of address pulse waves. The order of the pulse waves including the address pulse waves in the pulse width modulation signal is preset in the preset reference information. Time points at which the address pulse waves appear respectively are preset in the preset reference information. The first messages and/or the second messages are preset to be encoded into the address pulse waves in the preset reference information. A number of the address pulse waves is preset in the preset reference information. Based on the preset reference information, the driver circuit decodes the plurality of pulse waves into the first messages and/or the second messages and accordingly determines which ones of the plurality of pulse waves are the address pulse waves. The driver circuit generates address information included in the instruction information according to all of the first messages and/or the second messages that are decoded from the address pulse waves.

In certain embodiments, the motor driver further includes a storage circuit connected to the driver circuit. The pulse waves of the pulse width modulation signal further include a read/write pulse wave. The order of the pulse waves including the read/write pulse wave in the pulse width modulation signal is preset in the preset reference information. The first message or the second message is preset to be encoded into the read/write pulse wave in the preset reference information. A number of the read/write pulse wave is preset in the preset reference information. The driver circuit determines which one of the pulse waves is the read/write pulse wave based on the preset reference information. The driver circuit reads original information stored in an address instructed by the address information when the driver circuit decodes the read/write pulse into the first message. The driver circuit writes the instruction information into the address when the driver circuit decodes the read/write pulse into the second message.

In certain embodiments, the pulse waves of the pulse width modulation signal further include a plurality of preamble pulse waves. The order of the pulse waves including the preamble pulse waves in the pulse width modulation signal is preset in the preset reference information. Time points at which the preamble pulse waves appear respectively are preset in the preset reference information. The first messages and/or the second messages are preset to be encoded into the preamble pulse waves in the preset reference information. A number of the preamble pulse waves is preset in the preset reference information. The driver circuit determines that the preamble pulse waves appear in the pulse width modulation signal based on the preset reference information when the driver circuit determines that a number of the first messages and/or the second messages that are decoded from the pulse waves being continually generated reaches a preamble number threshold.

In certain embodiments, the pulse waves of the pulse width modulation signal further include a plurality of driving parameter pulse waves. The order of the pulse waves including the driving parameter pulse waves in the pulse width modulation signal is preset in the preset reference information. Time points at which the driving parameter pulse waves appear respectively are preset in the preset reference information. The first messages and/or the second messages are preset to be encoded into the driving parameter pulse waves in the preset reference information. A number of the driving parameter pulse waves is preset in the preset reference information. The driver circuit decodes each of the pulse waves into the first messages or the second messages. The driver circuit determines which ones of the pulse waves are the driving parameter pulse waves based on the preset reference information. The driver circuit decodes all of the driving parameter pulse waves to obtain the first messages and/or the second messages. The driver circuit generates driving parameter information included in the instruction information based on the first messages and/or the second messages that are decoded from the driving parameter pulse waves. The driver circuit drives the motor according to the driving parameter information.

In certain embodiments, the pulse waves of the pulse width modulation signal further include a parity pulse wave. The order of the pulse waves including the parity pulse wave in the pulse width modulation signal is preset in the preset reference information. A time point at which the parity pulse wave appears is preset in the preset reference information. The first message or the second message is preset to be encoded into the parity pulse wave in the preset reference information. A number of the parity pulse wave is preset in the preset reference information. The driver circuit determines which one of the pulse waves is the parity pulse wave based on the preset reference information. The driver circuit determines that the parity pulse wave indicates even parity checking instruction information when the driver circuit decodes the parity pulse wave into the first message. The driver circuit determines that the parity pulse wave indicates an odd parity checking instruction information when the driver circuit decodes the parity pulse wave into the second message.

In certain embodiments, the pulse waves of the pulse width modulation signal further include a starting pulse wave. The order of the pulse waves including the starting pulse wave in the pulse width modulation signal is preset in the preset reference information. A time point at which the starting pulse wave appears is preset in the preset reference information. The first message is preset to be encoded into the starting pulse wave in the preset reference information. A number of the starting pulse wave is preset in the preset reference information. When the driver circuit decodes one of the pulse waves into the first message, the driver circuit determines whether or not the one of the pulse waves is the starting pulse wave based on the preset reference information.

In certain embodiments, the pulse waves of the pulse width modulation signal further include a stopping pulse wave. The order of the pulse waves including the stopping pulse wave in the pulse width modulation signal is preset in the preset reference information. A time point at which the stopping pulse wave appears is preset in the preset reference information. The second message is preset to be encoded into the stopping pulse wave in the preset reference information. A number of the stopping pulse wave is preset in the preset reference information. When the driver circuit decodes one of the pulse waves into the second message, the driver circuit determines whether or not the one of the pulse waves is the stopping pulse wave based on the preset reference information.

In certain embodiments, the driver circuit adjusts a duty cycle of an initial feedback signal according to feedback information that the driver circuit is to transmit to the main controller to output a feedback signal having a plurality of waveforms to the main controller. The main controller decodes each of the waveforms each having a duty cycle that is equal to a first preset duty cycle or falls within a first preset duty cycle range into the first message. The main controller decodes each of the waveforms each having a duty cycle that is equal to a second preset duty cycle or falls within a second preset duty cycle range into the second message. The main controller arranges and combines all of the first messages and the second messages that are decoded from the waveforms according to an order of the waveforms in the feedback signal and time points at which the waveforms appear respectively to obtain the feedback information.

In certain embodiments, the waveforms of the feedback signal include a plurality of preamble waveforms. The order of the plurality of waveforms including the preamble waveforms in the feedback signal is preset in the preset reference information. Time points at which the preamble waveforms appear respectively are preset in the preset reference information. The first messages and/or the second messages are preset to be encoded into the preamble waveforms in the preset reference information. A number of the preamble waveforms is preset in the preset reference information. The driver circuit determines that the preamble waveforms appear in the feedback signal based on the preset reference information when the driver circuit determines that a number of the first messages and the second messages that are decoded from the waveforms continually generated reaches a preamble number threshold.

In certain embodiments, the waveforms of the feedback signal include a plurality of motor state waveforms. The order of the plurality of waveforms including the motor state waveforms in the feedback signal is preset in the preset reference information. Time points at which the motor state waveforms appear respectively are preset in the preset reference information. The first messages and/or the second messages are preset to be encoded into the preamble waveforms in the preset reference information. A number of the preamble waveforms is preset in the preset reference information. The driver circuit determines which ones of the plurality of waveforms are the motor state waveforms based on the preset reference information. The driver circuit decodes each of the plurality of motor state waveforms into the first message or the second message. The driver circuit generates motor state information included in the feedback information according to the first messages and/or the second messages that are decoded from the plurality of motor state waveforms.

In certain embodiments, the waveforms of the feedback signal include a parity waveform. The order of the plurality of waveforms including the parity waveform in the feedback signal is preset in the preset reference information. A time point at which the parity waveform appears is preset in the preset reference information. A number of the parity waveform is preset in the preset reference information. The first message is preset to represent an even parity checking instruction information in the preset reference information. The second message is preset to represent an odd parity checking instruction information in the preset reference information. The driver circuit determines which one of the plurality of waveforms is the parity waveform based on the preset reference information. The driver circuit determines that the parity waveform from which the first message is decoded indicates the even parity checking instruction information. The driver circuit determines that the parity waveform from which the second message is decoded indicates the odd parity checking instruction information.

In certain embodiments, the waveforms of the feedback signal include a starting waveform. The order of the plurality of waveforms including the starting waveform in the feedback signal is preset in the preset reference information. A time point at which the starting waveform appears is preset in the preset reference information. The first message is preset to be encoded into the starting waveform in the preset reference information. A number of the starting waveform is preset in the preset reference information. The driver circuit determines that the waveform from which the first message is decoded is the starting waveform based on the preset reference information.

In certain embodiments, the waveforms of the feedback signal include a stopping waveform. The order of the plurality of waveforms including the stopping waveform in the feedback signal is preset in the preset reference information. A time point at which the stopping waveform appears is preset in the preset reference information. The second message is preset to be encoded into the stopping waveform in the preset reference information. A number of the stopping waveform is preset in the preset reference information. The driver circuit determines that the waveform from which the second message is decoded is the stopping waveform based on the preset reference information.

As described above, the system provided by the present disclosure has the following advantages:

1. when the main controller updates the driving parameters of the motor that is stored in the register of the motor driver, the motor does not stop rotating;
2. the motor driver immediately adjusts the driving parameters of the motor according to the instructions of the main controller, such that an adjustment efficiency thereof is high;
3. the system does not need to enter a default mode, the main controller does not need to output the pulse width modulation signal for instructing the motor driver to stop driving the motor during the default time (otherwise referred to as a waiting time), and the main controller does not need to determine whether or not the system has entered the default mode, thereby improving a yield rate and an efficiency of the motor driver; and
4. the system only adopts a digital control such that an anti-noise ability is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
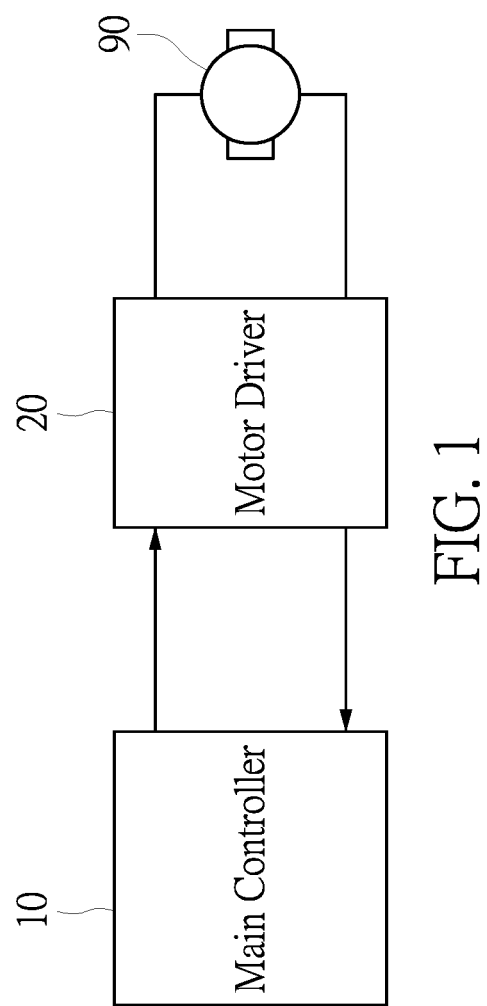
FIG. 1 is a block diagram of a system of driving and controlling a motor according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
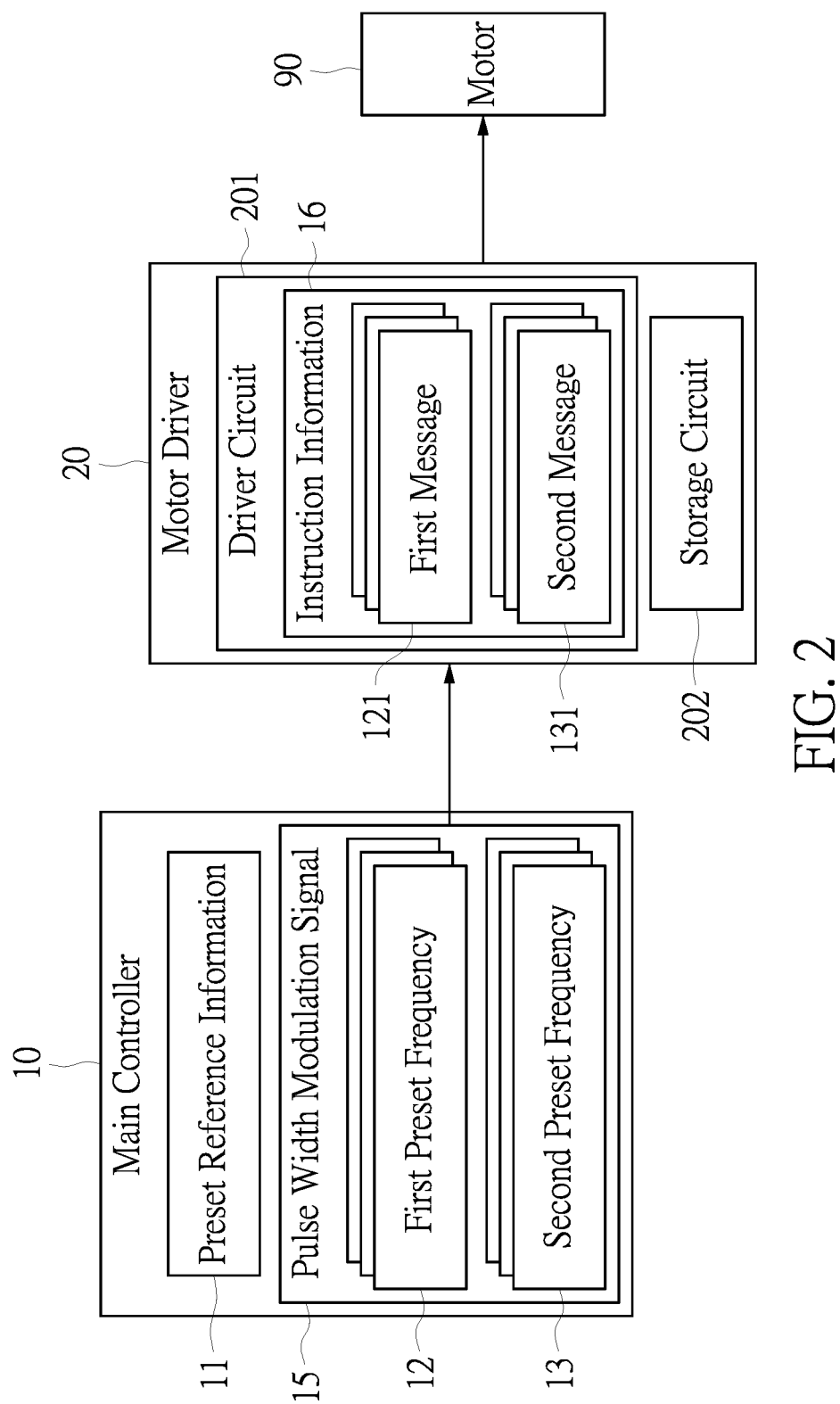
FIG. 2 is a block diagram depicting a main controller of the system transmitting a signal to a motor driver according to the embodiment of the present disclosure.

Reference is made to FIGS. 1 and 2, in which FIG. 1 is a block diagram of a system of driving and controlling a motor according to an embodiment of the present disclosure, and FIG. 2 is a block diagram of a motor driver and a main controller transmitting a signal to the motor driver in the system according to the embodiment of the present disclosure.

As shown in FIG. 1, in the embodiment, the system may include a main controller 10 and a motor driver 20, and may be applicable to a motor 90. Signals may be transmitted between the main controller 10 and the motor driver 20.

As shown in FIG. 2, the motor driver 20 may include a driver circuit 201 and a storage circuit 202. The storage circuit 202 may be a register or other storing components, but the present disclosure is not limited thereto. The main controller 10 may transmit a signal to the driver circuit 201 of the motor driver 20, so as to control the driver circuit 201 of the motor driver 20 to operate.

The main controller 10 may generate preset reference information 11 or obtain the preset reference information 11 from an additional circuit. The main controller 10 may preset a first preset frequency 12 to represent a first message 121, and preset a second preset frequency 13 to represent a second message 131 in the preset reference information 11. On the other hand, the motor driver 20 may obtain the preset reference information 11 from the additional circuit or the main controller 10.

The main controller 10 may output an initial pulse width modulation signal to the motor driver 20. Based on a duty cycle of the initial pulse width modulation signal, the motor driver 20 is controlled to drive the motor 90 to rotate stably according to initial driving parameters of the motor 90 that are stored in the storage circuit 202 of the motor driver 20.

It is worth noting that, when the motor is rotating, instruction information 16 provided by the main controller 10 can be written into the motor driver 20 and do not affect the stable rotation of the motor 90. A detailed description thereof is provided below.

The main controller 10 adjusts frequencies of all or some of a plurality of pulse waves of the initial pulse width modulation signal according to the instruction information 16 that the main controller is to transmit to the motor driver 20, based on an order of the plurality of pulse waves of the initial pulse width modulation signal and time points at which the pulse waves appear respectively. For example, the instruction information 16 may include new driving parameters of the motor 90. The adjusted frequency of each of the pulse waves is equal to the first preset frequency 12 or the second preset frequency 13.

Finally, the main controller 10 outputs a pulse width modulation signal 15 according to the adjusted initial pulse width modulation signal. That is, the main controller 10 encodes contents of the instruction information 16 into the pulse width modulation signal 15.

The driver circuit 201 of the motor driver 20 may be connected to the storage circuit 202 of the motor driver 20, the main controller 10 and the motor 90. The driver circuit 201 may receive the pulse width modulation signal 15 from the main controller 10. The motor driver 20 may drive the motor 90 to stably rotate based on a duty cycle of the pulse width modulation signal 15.

It is worth noting that the main controller 10 only adjusts the frequencies of the pulse waves of the initial pulse width modulation signal to generate the pulse width modulation signal 15, but does not adjust the duty cycle of each of the pulse waves of the initial pulse width modulation signal according to the instruction information 16 that the main controller 10 is to transmit to the motor driver 20. The duty cycle of the pulse width modulation signal 15 is equal to the duty cycle of the initial pulse width modulation signal. Therefore, no matter whether the motor 90 is driven based on the initial pulse width modulation signal or the pulse width modulation signal 15, a rotational speed of the motor 90 is maintained at a constant value. That is, when the main controller 10 transmits the instruction information 16 to the motor driver 20, the rotational speed of the motor 90 is not affected.

When the motor 90 continually rotates and the rotational speed of the motor 90 is maintained at the constant value, the driver circuit 201 of the motor driver 20 may decode each of the pulse waves each having the first preset frequency 12 in the pulse width modulation signal 15 into the first message 121, and decode each of the pulse waves each having the second preset frequency 13 in the pulse width modulation signal 15 into the second message 131.

Finally, the driver circuit 201 of the motor driver 20 may arrange and combine all of the first messages 121 and the second messages 131 that are decoded from the pulse waves of the pulse width modulation signal 15 to obtain the instruction information 16 according to the order of the pulse waves of the pulse width modulation signal 15 and the time points at which the pulse waves of the pulse width modulation signal 15 appear respectively.

For example, one of the first message 121 and the second message 131 is represented by a bit value "0", and another one of the first message 121 and the second message 131 is represented by a bit value "1". The instruction information 16 may be represented by a bit string.

When the driver circuit 201 drives the motor 90 to rotate at the constant rotational speed based on the duty cycles of the pulse waves of the pulse width modulation signal 15, the driver circuit 201 may execute an operation instructed by the instruction information 16.

Figure 3:
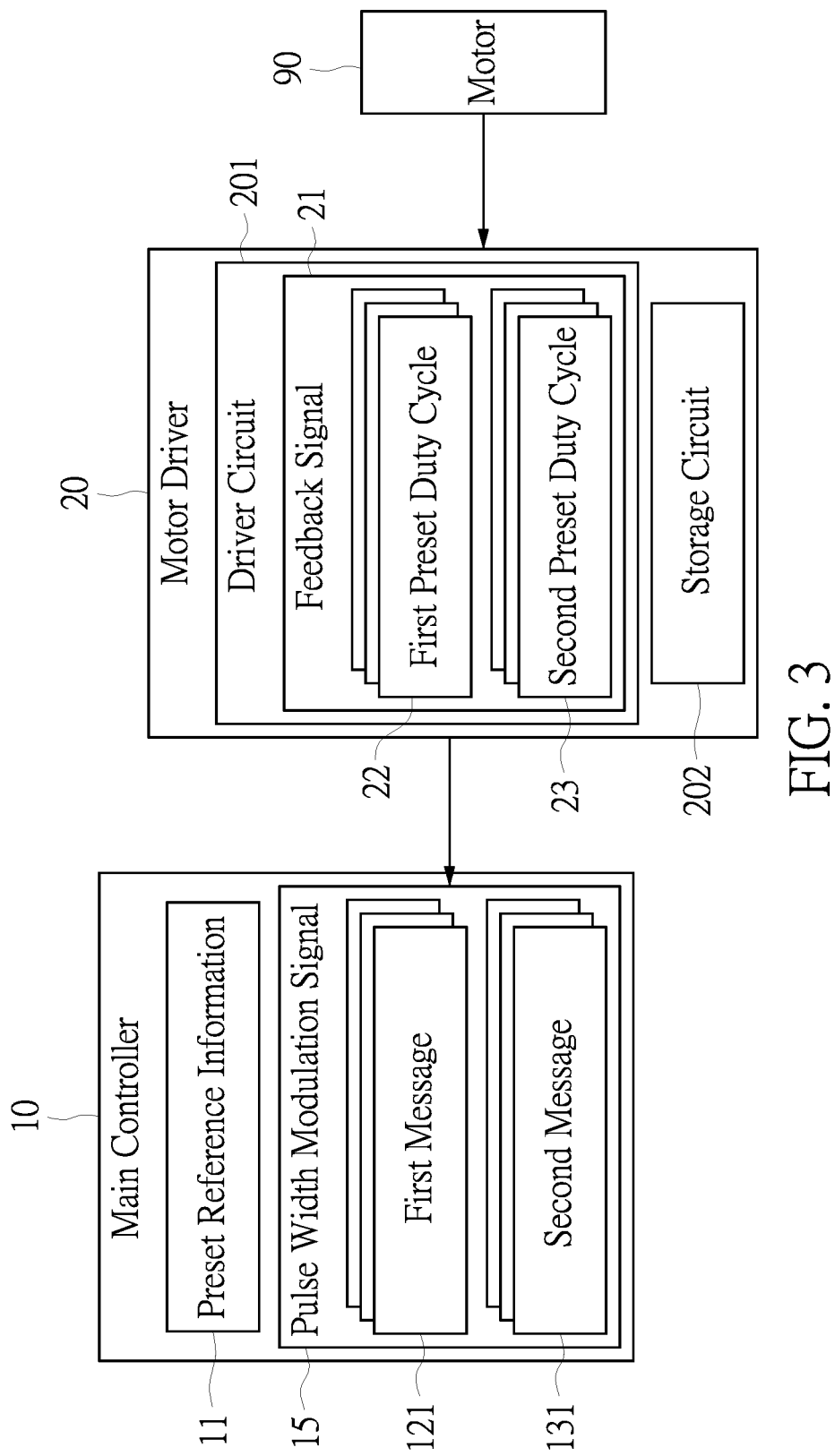
FIG. 3 is a block diagram depicting the motor driver of the system transmitting a signal to the main controller according to the embodiment of the present disclosure.

Reference is made to FIGS. 1 and 3, in which FIG. 1 is a block diagram of a system of driving and controlling a motor according to an embodiment of the present disclosure, and FIG. 3 is a block diagram of the main controller and the motor driver transmitting a signal to the main controller in the system according to the embodiment of the present disclosure. The same descriptions are not repeated herein.

As shown in FIG. 3, the motor driver 20 may transmit a state of the motor 90 to the main controller 10. In practice, the motor driver 20 may transmit instructions that are issued to the motor 90 by the motor driver 20 to the main controller 10. That is, feedback information (which will be described below) may include the state of the motor 90 or the instructions issued to the motor 90.

It is worth noting that, as described above, the initial pulse width modulation signal that is transmitted to the motor driver 20 from the main controller 10 is used to drive the motor 90, and thus the frequencies (but not duty cycles of the initial pulse width modulation signal) are adjusted. Conversely, a feedback signal 21 that is transmitted to main controller 10 from the motor driver 20 is not used to drive the motor 90, and thus a duty cycle of the feedback signal 21 may be adjusted or set according to the feedback information that the motor driver 20 is to transmit to the main controller 10.

In the embodiment, the driver circuit 20 may adjust a duty cycle of an initial feedback signal 21 according to the feedback information that the driver circuit 20 is to transmit to the main controller 10, so as to output the feedback signal 21 having a plurality of waveforms to the main controller 10. Alternatively, the driver circuit 20 may directly generate the feedback signal 21 according to the feedback information.

In the preset reference information 11 that is generated by the main controller 10 or obtained by the main controller 10 and the motor driver 20, a first preset duty cycle 22, a first preset duty cycle range, a second preset duty cycle 23, a second preset duty cycle range, the first message 121 and the second message 131 are set. A duty cycle that is equal to the first preset duty cycle 22 or falls within the first preset duty cycle range represents the first message 121 according to the preset reference information 11. A duty cycle that is equal to the second preset duty cycle 23 or falls within the second preset duty cycle range represents the second message 131 according to the preset reference information 11.

When the main controller 10 receives the feedback signal 21 from the motor driver 20, the main controller 10 decodes each of the waveforms each having the duty cycle that is equal to the first preset duty cycle 22 or falls within the first preset duty cycle range into the first message 121, and decodes each of the waveforms each having the duty cycle that is equal to the second preset duty cycle 22 or falls within the second preset duty cycle range into the second message 131.

Finally, according to the order of the waveforms in the feedback signal 21 and the time points at which the waveforms of the feedback signal 21 respectively appear, the main controller 10 may arrange and combine all of the first messages 121 and the second messages 131 that are decoded from the waveforms of the feedback signal 21 to obtain the feedback information.

Figure 4:
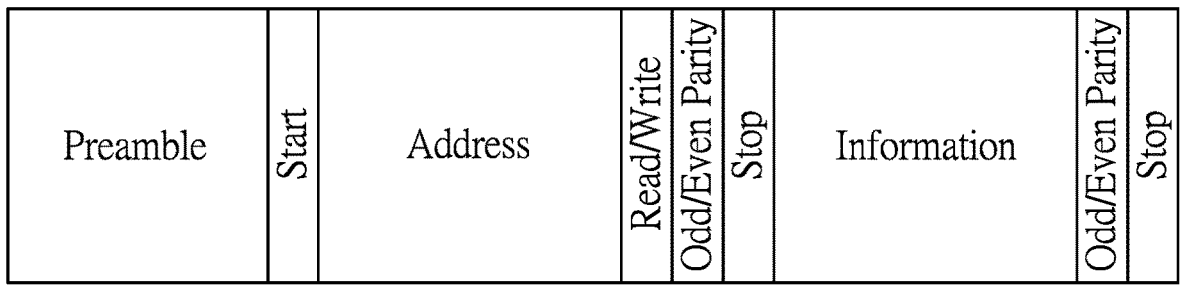
FIG. 4 is a schematic diagram of one configuration of a pulse width modulation signal of the system according to the embodiment of the present disclosure.

Reference is made to FIGS. 2 and 4, in which FIG. 2 is a block diagram of a motor driver and a main controller transmitting a signal to the motor driver in the system according to the embodiment of the present disclosure, and FIG. 4 is a first schematic diagram of a pulse width modulation signal of the system according to the embodiment of the present disclosure.

As described above, the first preset frequency 12 is preset to represent the first message 121 in the preset reference information 11, and the second preset frequency 13 is preset to represent the second message 131 in the preset reference information 11.

The plurality of pulse waves of the pulse width modulation signal 15 shown in FIG. 2 may include a plurality of preamble pulse waves representing a preamble shown in FIG. 4. A number of the preamble pulse waves representing the preamble and a number of the first messages 121 and/or the second messages 131 that are arranged and combined into the preamble pulse waves representing the preamble are preset in the above-mentioned preset reference information 11.

The driver circuit 201 decodes each of the pulse waves each having the first preset frequency 12 in the pulse width modulation signal 15 into the first message 121. The driver circuit 201 decodes each of the pulse waves each having the second preset frequency 13 in the pulse width modulation signal 15 into the second message 131. Then, the driver circuit 201 may calculate a number of the first message 121 and/or the second message 131 that are decoded from the pulse waves continually generated in the pulse width modulation signal 15.

Finally, when the driver circuit 201 determines that the number of the first messages 121 and/or the second messages 131 that are decoded from the pulse waves continually generated in the pulse width modulation signal 15 reaches a preamble number threshold included in the preset reference information 11, the driver circuit 201 determines that the preamble pulse waves appear in the pulse width modulation signal 15 and accordingly determines that the preamble appears.

For example, the first message 121 may be represented by a bit value "0", and the second message 131 may be represented by a bit value "1". Under this condition, when the preamble is preset to be represented by six bit values "1" in the preset reference information 11, the six bit values "1" are respectively encoded into six pulse waves (as the preamble pulse waves) each having the first preset frequency 12 in the pulse width modulation signal 15.

As shown in FIG. 4, the plurality of pulse waves of the pulse width modulation signal 15 may include one starting pulse wave, but the present disclosure is not limited thereto. In practice, a number of the starting pulse waves may be determined according to practical requirements. In the preset reference information 11, a time point at which the starting pulse wave appears may be preset to be later than time points at which the preamble pulse waves respectively appear. In the embodiment, the starting pulse wave may be preset to represent the first message 121 in the preset reference information 11, but the present disclosure is not limited thereto. In practice, the starting pulse wave may be preset to represent the second message 131.

The order of the plurality of pulse waves including the starting pulse wave in the pulse width modulation signal 15 is preset in the preset reference information 11. A time point at which the starting pulse wave appears is preset in the preset reference information 11. The first message 121 (or the second message 131 in practice) is preset to be encoded into the starting pulse wave in the preset reference information 11. A number of the starting pulse wave is preset in the preset reference information 11. When the driver circuit 201 receives the pulse width modulation signal 15 and decodes one of the pulse waves of the pulse width modulation signal 15 into the first message 121 (or the second message 131 in practice), the driver circuit 201 determines whether or not the one of the pulse waves is the starting pulse wave based on the preset reference information 11.

As shown in FIG. 4, the plurality of pulse waves of the pulse width modulation signal 15 may include a plurality of address pulse waves, but the present disclosure is not limited thereto. In practice, there may be only one address pulse wave. According to an amount of data (of a driving parameter information) that is intended to be written into the storage circuit 202 and addresses of the storage circuit 202, a number of the address pulse waves that are arranged and combined into the pulse width modulation signal 15 and the number of the first messages 121 and/or the second messages 131 that are encoded into the address pulse waves may be set in the preset reference information 11.

The order of the plurality of pulse waves including the address pulse waves in the pulse width modulation signal 15 is preset in the preset reference information 11. Time points at which the address pulse waves appear respectively are preset in the preset reference information 11. The first messages 121 and/or the second messages 131 are preset to be encoded into the address pulse waves in the preset reference information 11. The number of the address pulse waves is preset in the preset reference information 11. The driver circuit 201 may determine which some of the plurality of pulse waves of the pulse width modulation signal 15 are the address pulse waves based on the preset reference information 11. The driver circuit 201 then decodes each of the address pulse waves into the first messages 121 or the second messages 131. Finally, the driver circuit 201 generates address information included in the instruction information 16 according to all of the first messages 121 and/or the second messages 131 that are decoded from the address pulse waves of the pulse width modulation signal 15.

In the embodiment, the plurality of pulse waves of the pulse width modulation signal 15 may include a read/write pulse wave, but the present disclosure is not limited thereto. In practice, the plurality of pulse waves of the pulse width modulation signal 15 may include multiple ones of the read/write pulse wave. In the preset reference information 11, one of a reading operation and a writing operation is represented by the first message 121, and another one of the reading operation and the writing operation is represented by the second message 131.

The order of the plurality of pulse waves including the read/write pulse wave in the pulse width modulation signal 15 is preset in the preset reference information 11. The first message 121 or the second message 131 is preset to be encoded into the read/write pulse wave in the preset reference information 11. A number of the read/write pulse wave is preset in the preset reference information 11. The driver circuit 201 may determine which one of the pulse waves of the pulse width modulation signal 15 is the read/write pulse wave based on the preset reference information 11.

When the driver circuit 201 decodes the read/write pulse into the first message 121 (or the second message 131 in practice), the driver circuit 201 reads original information stored in an address of the storage circuit 202 that is instructed by the address information. Conversely, when the driver circuit 201 decodes the read/write pulse into the second message 131 (or the first message 121 in practice), the driver circuit 201 writes the instruction information 16 into the address instructed by the address information.

As shown in FIG. 4, the plurality of pulse waves of the pulse width modulation signal 15 may include a plurality of parity pulse waves, but the present disclosure is not limited thereto. In practice, there may be only one parity pulse wave. In the embodiment, the plurality of parity pulse waves may include a first parity pulse wave and a second parity pulse, but the present disclosure is not limited thereto. A time point at which the first parity pulse wave appears may be later than a time point at which the read/write pulse wave appears, and may be earlier than a time point at which a first stopping pulse wave (which will be described below) appears. A time point at which the second parity pulse appears may be later than time points at which a plurality of driving parameter pulse waves (which will be described below) respectively appear, and may be earlier than a time point at which a second stopping pulse wave (which will be described below) appears.

In the preset reference information 11, one of an even parity checking instruction information and an odd parity checking instruction information may be represented by the first message 121, and another one of the even parity checking instruction information and the odd parity checking instruction information may be represented by the second message 131.

The order of the plurality of pulse waves including the parity pulse wave in the pulse width modulation signal 15 is preset in the preset reference information 11. A time point at which the parity pulse wave appears is preset in the preset reference information 11. The first message 121 or the second message 131 is preset to be encoded into the parity pulse wave in the preset reference information 11. A number of the parity pulse wave is preset in the preset reference information 11. The driver circuit 201 may determine which one of the pulse waves is the parity pulse wave or which some of the pulse waves are the parity pulse waves based on the preset reference information 11. When the driver circuit 201 decodes the parity pulse wave into the first message 121 (or the second message 131 in practice), the driver circuit 201 determines that the parity pulse wave indicates the even parity checking instruction information. Conversely, when the driver circuit 201 decodes the parity pulse wave into the second message 131 (or the first message 121 in practice), the driver circuit 201 determines that the parity pulse wave indicates the odd parity checking instruction information.

When the driver circuit 201 decodes the parity pulse wave into the odd parity checking instruction information, the driver circuit 201 determines whether or not a number of the bit values "1" currently decoded from the pulse waves of the pulse width modulation signal 15 is an odd number. Then, when the driver circuit 201 determines that the number of the bit values "1" currently decoded from the pulse waves of the pulse width modulation signal 15 is an even number, a parity check code "1" is combined with the currently decoded bit values as a least significant bit value.

Conversely, when the driver circuit 201 decodes the parity pulse wave into the even parity checking instruction information, the driver circuit 201 determines whether or not the number of the bit values "1" currently decoded from the pulse waves of the pulse width modulation signal 15 is the even number. Then, when the driver circuit 201 determines that the number of the bit values "1" currently decoded from the pulse waves of the pulse width modulation signal 15 is the odd number, a parity check code "1" is combined with the currently decoded bit values as a least significant bit value.

As shown in FIG. 4, the plurality of pulse waves of the pulse width modulation signal 15 may include a plurality of stopping pulse waves such as a first stopping pulse wave and a second stopping pulse wave, but the present disclosure is not limited thereto. In practice, there may be only one stopping pulse wave. A time point at which the first stopping pulse wave appears may be later than the time point at which the first parity pulse wave appears, and may be earlier than time points at which the driving parameter pulse waves (which will be described below) appear respectively. A time point at which the second stopping pulse wave appears may be later than a time point at which the second parity pulse wave appears.

The second message 131 may be preset to be encoded into the stopping pulse wave in the above-mentioned preset reference information 11, but the present disclosure is not limited thereto. In practice, the first message 121 may be present to be encoded into the stopping pulse wave in the preset reference information 11. The order of the plurality of pulse waves including the stopping pulse wave in the pulse width modulation signal 15 is preset in the preset reference information 11. A time point at which the stopping pulse wave appears is preset in the preset reference information 11. The second message 131 is preset to be encoded into the stopping pulse wave in the preset reference information 11. A number of the stopping pulse wave is preset in the preset reference information 11. In the embodiment, when the driver circuit 201 decodes one of the pulse waves of the pulse width modulation signal 15 into the second message 131, the driver circuit 201 determines whether or not the one of pulse waves from which the second message 131 is decoded is the stopping pulse wave based on the preset reference information 11.

As shown in FIG. 4, the plurality of pulse waves of the pulse width modulation signal 15 may include the plurality of driving parameter pulse waves. The order of the plurality of pulse waves including the driving parameter pulse waves in the pulse width modulation signal 15 is preset in the preset reference information 11. The time points at which the driving parameter pulse waves appear respectively are preset in the preset reference information 11. The first messages 121 and/or the second messages 131 are preset to be encoded into the driving parameter pulse waves in the preset reference information 11. A number of the driving parameter pulse waves is preset in the preset reference information 11. The driver circuit 201 may determine which some of the pulse waves are the driving parameter pulse waves based on the preset reference information 11.

The driver circuit 201 decodes each of the driving parameter pulse waves of the pulse width modulation signal 15 into the first messages 121 or the second message 131. After the driver circuit 201 decodes all of the driving parameter pulse waves to obtain the first messages 121 and/or the second messages 131, the driver circuit 201 generates the driving parameter information included in the instruction information 16 based on the first messages 121 and/or the second messages 131 that are decoded from the driving parameter pulse waves of the pulse width modulation signal 15. The driver circuit 201 drives the motor 90 according to the driving parameter information (which replaces an original driving parameter information).

Figure 5:
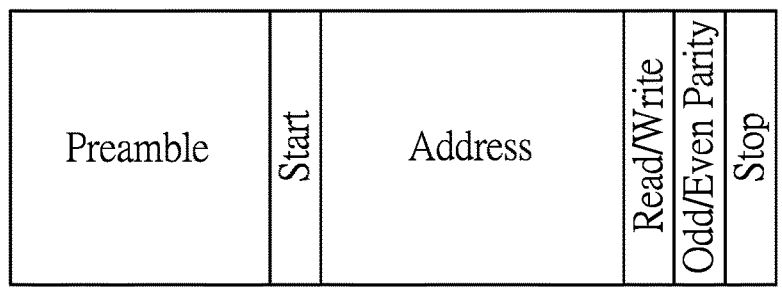
FIG. 5 is a schematic diagram of another configuration of the pulse width modulation signal of the system according to the embodiment of the present disclosure.

Reference is made to FIGS. 2 and 5, in which FIG. 2 is a block diagram of a motor driver and a main controller transmitting a signal to the motor driver in the system according to the embodiment of the present disclosure, and FIG. 5 is a second schematic diagram of a pulse width modulation signal of the system according to the embodiment of the present disclosure. The same descriptions are not repeated herein.

As described above, when the main controller 10 provides the driving parameter information of the motor 90 to the driver circuit 201 of the motor driver 20 and instructs the driver circuit 201 to write the driving parameter information into the storage circuit 202, the main controller 10 may output the pulse width modulation signal 15 having contents of the instruction information 16 shown in FIG. 4 to the driver circuit 201.

In contrast, when the main controller 10 intends to instruct the driver circuit 201 of the motor driver 20 to read information stored in the driver circuit 201, the main controller 10 may output the pulse width modulation signal 15 having contents of the instruction information 16 shown in FIG. 5 to the driver circuit 201.

Figure 6:
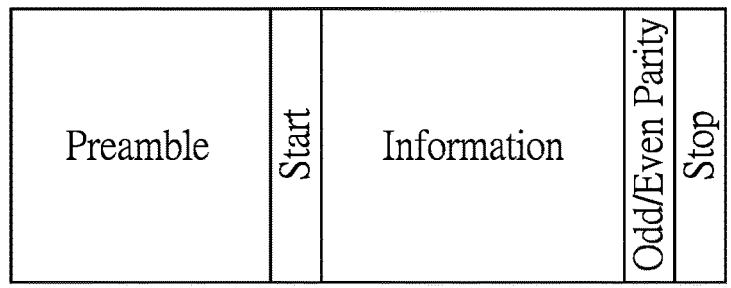
FIG. 6 is a schematic diagram of a feedback signal of the system according to the embodiment of the present disclosure.

Reference is made to FIGS. 3 and 6, in which FIG. 3 is a block diagram of the main controller and the motor driver transmitting a signal to the main controller in the system according to the embodiment of the present disclosure, and FIG. 6 is a schematic diagram of a feedback signal of the system according to the embodiment of the present disclosure. The same descriptions are not repeated herein.

When the driver circuit 201 of the motor driver 20 is to transmit information related to the motor 90 to the main controller 10, the motor driver 20 may output the feedback signal 21 having contents of the feedback information shown in FIG. 6 to the main controller 10. For example, the information related to the motor 90 may include the state information of the motor 90 and the instructions that are issued to the motor 90 by the motor driver 20.

As shown in FIG. 6, the waveforms of the feedback signal 21 may include a plurality of preamble waveforms. An order of the plurality of waveforms including the preamble waveforms in the feedback signal 21 is preset in the preset reference information 11. Time points at which the preamble waveforms appear respectively are preset in the preset reference information 11. The first messages 121 and/or the second messages 131 are preset to be encoded into the preamble waveforms in the preset reference information 11. A number of the preamble waveforms is preset in the preset reference information 11. When the driver circuit 201 shown in FIG. 3 determines that a number of the first messages 121 and the second messages 131 that are decoded from the continually-generated waveforms in the feedback signal 21 reaches a preamble number threshold based on the preset reference information 11, the driver circuit 201 determines that the plurality of preamble waveforms appear in the feedback signal 21.

The waveforms of the feedback signal 21 further include a plurality of motor state waveforms. The order of the plurality of waveforms including the motor state waveforms in the feedback signal 21 is preset in the preset reference information 11. Time points at which the motor state waveforms appear respectively are preset in the preset reference information 11. The first messages 121 and/or the second messages 131 are preset to be encoded into the preamble waveforms in the preset reference information 11. A number of the preamble waveforms is preset in the preset reference information 11. The driver circuit 201 may determine which some of the plurality of waveforms are the motor state waveforms based on the preset reference information 11. The driver circuit 201 decodes each of the plurality of motor state waveforms into the first message 121 or the second message 131. The driver circuit 20 generates motor state information included in the feedback information based on the first messages 121 and/or the second messages 131 that are decoded from the plurality of motor state waveforms of the feedback signal 21.

The waveforms of the feedback signal 21 include a parity waveform. The order of the plurality of waveforms including the parity waveform in the feedback signal 21 is preset in the preset reference information 11. A time point at which the parity waveform appears is preset in the preset reference information 11. A number of the parity waveform is preset in the preset reference information 11. The first message 121 or the second message 131 is preset to be encoded into the parity waveform in the preset reference information 11. The driver circuit 201 may determine which one of the waveforms of the feedback signal 21 is the parity waveform based on the preset reference information 11. When the driver circuit 201 decodes the parity waveform into the first message 121 (or the second message 131 in practice), the driver circuit 201 determines that the parity waveform indicates the even parity checking instruction information. When driver circuit 201 decodes the parity waveform into the second message 131 (or the first message 121 in practice), the driver circuit 201 determines that the parity waveform indicates the odd parity checking instruction information.

The waveforms of the feedback signal 21 include a starting waveform. The order of the plurality of waveform including the starting waveform in the feedback signal 21 is preset in the preset reference information 11. A time point at which the starting waveform appears is preset in the preset reference information 11. The first message 121 is preset to be encoded into the starting waveform in the preset reference information 11. A number of the starting waveform is preset in the preset reference information 11. When the driver circuit 201 decodes one of the waveforms of the feedback signal 21 into the first message 121, the driver circuit 201 determines whether or not the one of the waveforms is the starting waveform based on the preset reference information 11.

The waveforms of the feedback signal 21 include a stopping waveform. The order of the plurality of waveforms including the stopping waveform in the feedback signal 21 is preset in the preset reference information 11. A time point at which the stopping waveform appears is preset in the preset reference information 11. The second message 131 is preset to be encoded into the stopping waveform in the preset reference information 11. A number of the stopping waveform is preset in the preset reference information 11. When the driver circuit 201 decodes one of the waveforms of the feedback signal 21 into the second message 131, the driver circuit 201 determines whether or not the one of the waveforms of the feedback signal 21 is the stopping waveform based on the preset reference information 11.

Figure 7:
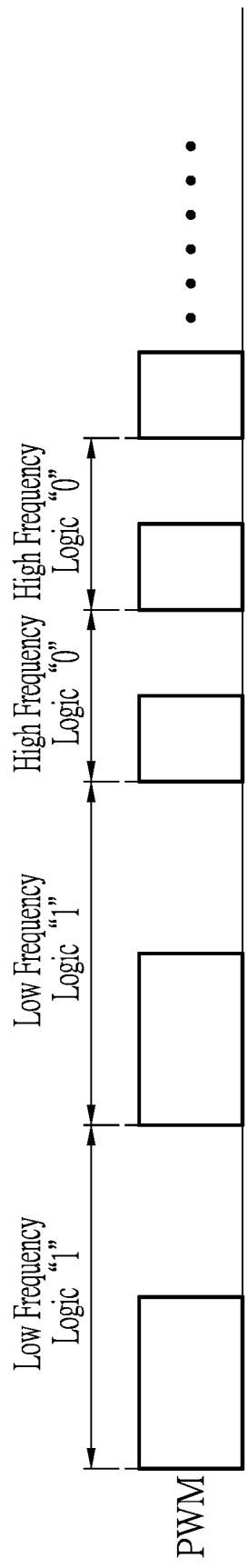
FIG. 7 is a waveform diagram of the pulse width modulation signal of the system according to the embodiment of the present disclosure.

Reference is made to FIG. 7, which is a waveform diagram of a pulse width modulation signal of the system according to the embodiment of the present disclosure.

As described above, the main controller 10 shown in FIG. 2 may transmit the pulse width modulation signal 15 to the motor driver 20 shown in FIG. 2. The pulse waves of the pulse width modulation signal 15 may be the same as or different from pulse waves of a pulse width modulation signal PWM shown in FIG. 7.

For example, as shown in FIG. 7, the pulse width modulation signal PWM may include two pulse waves each having a first preset frequency (that is, a low frequency) and three pulse waves each having a second preset frequency (that is, a high frequency). For example, the first message 121 (such as the bit value "1") is represented by the first preset frequency, and the second message 131 (such as the bit value "0") is represented by the second preset frequency, but the present disclosure is not limited thereto.

According to the instruction information, the duty cycles of the pulse waves of the pulse width modulation signal PWM that are outputted by the main controller 10 to the motor driver 20 are the same to each other (for example, 50%).

Figure 8:
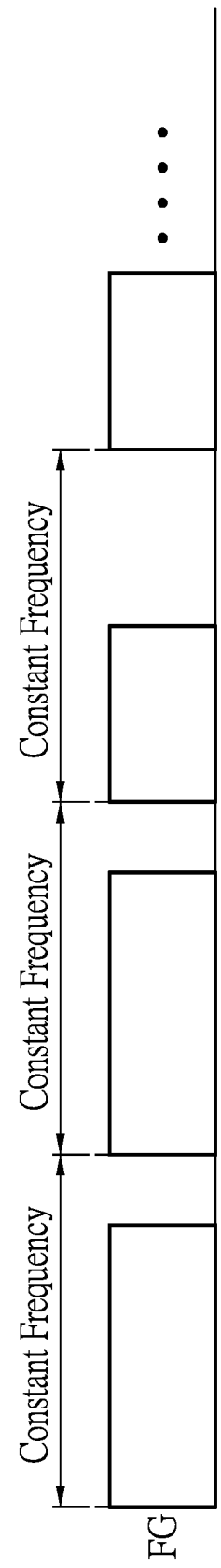
FIG. 8 is a waveform diagram of the feedback signal of the system according to the embodiment of the present disclosure.

Reference is made to FIG. 8, which is a waveform diagram of a feedback signal of the system according to the embodiment of the present disclosure.

As described above, the motor driver 20 shown in FIG. 3 may transmit the feedback signal 21 to the main controller 10 shown in FIG. 3. The waveforms of the feedback signal 21 may be the same as or different from waveforms of a feedback signal FG shown in FIG. 8.

For example, as shown in FIG. 8, two duty cycles of the waveforms of the feedback signal FG fall within the first preset duty cycle range (which can be, for example, greater than 75% but less than 25%), and two duty cycles of the waveforms of the feedback signal FG is equal to the second preset duty cycle (such as 50%), but the present disclosure is not limited thereto. The first message 121 (such as the bit value "1") is represented by the duty cycle falling within the first preset duty cycle range, and the second message 131 (such as the bit value "0") is represented by the second preset duty cycle, but the present disclosure is not limited thereto.

The frequencies of the waveforms of the feedback signal FG transmitted from the motor driver 20 to the main controller 10 are the same to each other.

In summary, the present disclosure provides the system, which has the following advantages:

1. when the main controller 10 updates the driving parameters of the motor that is stored in the register of the motor driver, the motor does not stop rotating;
2. the motor driver immediately adjusts the driving parameters of the motor according to the instructions of the main controller, an adjustment efficiency of which is high;
3. the system does not need to enter a default mode, the main controller does not need to output the pulse width modulation for instructing the motor driver to stop driving the motor during the default time (or called as a waiting time), the main controller does not need to determine whether or not the system enters the default mode, and thus a yield rate of and an efficiency of the motor driver can be improved; and
4. the system only uses a digital control manner such that an anti-noise ability is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system of driving and controlling a motor, comprising:
    a main controller configured to output an initial pulse width modulation signal, wherein the main controller generates or obtains a preset reference information from an additional circuit, a first preset frequency is preset to represent a first message, and a second preset frequency is preset to represent a second message in the preset reference information; wherein, based on an order of a plurality of pulse waves of the initial pulse width modulation signal and time points at which the pulse waves of the initial pulse width modulation signal respectively appear, the main controller adjusts frequencies of all or some of the plurality of pulse waves of the initial pulse width modulation signal according to instruction information that the main controller is to transmit; wherein the frequency of each of the pulse waves that is adjusted is equal to the first preset frequency or the second preset frequency, and the main controller outputs a pulse width modulation signal according to the initial pulse width modulation signal that is adjusted; and a motor driver including a driver circuit connected to the main controller and the motor, wherein the driver circuit is configured to receive the pulse width modulation signal from the main controller; wherein, when the driver circuit drives the motor to stably rotate based on the initial pulse width modulation signal, the driver circuit decodes each of the pulse waves having the first preset frequency into the first message based on the preset reference information, and the driver circuit decodes each of the pulse waves having the second preset frequency into the second message based on the preset reference information; wherein the driver circuit arranges and combines all of the first messages and the second messages that are decoded from the pulse waves to obtain the instruction information according to the order of the pulse waves of the pulse width modulation signal and the time points at which the pulse waves of the pulse width modulation signal respectively appear, and the driver circuit executes an operation instructed by the instruction information;

wherein the main controller does not adjust a duty cycle of each of the pulse waves according to the instruction information that the main controller is to transmit to the motor driver.

2. The system according to claim 1, wherein one of the first message and the second message is represented by a bit value "0", and another one of the first message and the second message is represented by a bit value "1".

3. The system according to claim 1, wherein the plurality of pulse waves of the pulse width modulation signal include a plurality of address pulse waves, the order of the pulse waves including the address pulse waves in the pulse width modulation signal is preset in the preset reference information, time points at which the address pulse waves respectively appear are preset in the preset reference information, the first messages and/or the second messages are preset to be encoded into the address pulse waves in the preset reference information, and a number of the address pulse waves is preset in the preset reference information; wherein, based on the preset reference information, the driver circuit decodes the plurality of pulse waves into the first messages and/or the second messages to determine which ones of the plurality of pulse waves are the address pulse waves, and the driver circuit generates address information included in the instruction information according to all of the first messages and/or the second messages that are decoded from the address pulse waves.

4. The system according to claim 3, wherein the motor driver further includes a storage circuit connected to the driver circuit, the plurality of pulse waves of the pulse width modulation signal further include a read/write pulse wave, the order of the pulse waves including the read/write pulse wave in the pulse width modulation signal is preset in the preset reference information, the first message or the second message is preset to be encoded into the read/write pulse wave in the preset reference information, a number of the read/write pulse wave is preset in the preset reference information, and the driver circuit determines which one of the pulse waves is the read/write pulse wave based on the preset reference information; wherein the driver circuit reads original information stored in an address instructed by the address information when the driver circuit decodes the read/write pulse into the first message, and the driver circuit writes the instruction information into the address when the driver circuit decodes the read/write pulse into the second message.

5. The system according to claim 3, wherein the plurality of pulse waves of the pulse width modulation signal further include a plurality of preamble pulse waves, the order of the pulse waves including the preamble pulse waves in the pulse width modulation signal is preset in the preset reference information, time points at which the preamble pulse waves respectively appear are preset in the preset reference information, the first messages and/or the second messages are preset to be encoded into the preamble pulse waves in the preset reference information, and a number of the preamble pulse waves is preset in the preset reference information; wherein, based on the preset reference information, the driver circuit determines that the preamble pulse waves appear in the pulse width modulation signal when the driver circuit determines that a number of the first messages and/or the second messages that are decoded from the pulse waves being continually generated reaches a preamble number threshold.

6. The system according to claim 3, wherein the plurality of pulse waves of the pulse width modulation signal further include a plurality of driving parameter pulse waves, the order of the pulse waves including the driving parameter pulse waves in the pulse width modulation signal is preset in the preset reference information, time points at which the driving parameter pulse waves respectively appear are preset in the preset reference information, the first messages and/or the second messages are preset to be encoded into the driving parameter pulse waves in the preset reference information, a number of the driving parameter pulse waves is preset in the preset reference information, the driver circuit decodes each of the pulse waves into the first messages or the second messages, and the driver circuit determines which ones of the pulse waves are the driving parameter pulse waves based on the preset reference information; wherein the driver circuit decodes all of the driving parameter pulse waves to obtain the first messages and/or the second messages, the driver circuit generates a driving parameter information included in the instruction information based on the first messages and/or the second messages that are decoded from the driving parameter pulse waves, and the driver circuit drives the motor according to the driving parameter information.

7. The system according to claim 3, wherein the plurality of pulse waves of the pulse width modulation signal further include a parity pulse wave, the order of the pulse waves including the parity pulse wave in the pulse width modulation signal is preset in the preset reference information, a time point at which the parity pulse wave appears is preset in the preset reference information, the first message or the second message is preset to be encoded into the parity pulse wave in the preset reference information, a number of the parity pulse wave is preset in the preset reference information, and the driver circuit determines which one of the pulse waves is the parity pulse wave based on the preset reference information; wherein the driver circuit determines that the parity pulse wave indicates even parity checking instruction information when the driver circuit decodes the parity pulse wave into the first message, and the driver circuit determines that the parity pulse wave indicates odd parity checking instruction information when the driver circuit decodes the parity pulse wave into the second message.

8. The system according to claim 3, wherein the plurality of pulse waves of the pulse width modulation signal further include a starting pulse wave, the order of the pulse waves including the starting pulse wave in the pulse width modulation signal is preset in the preset reference information, a time point at which the starting pulse wave appears is preset in the preset reference information, the first message is preset to be encoded into the starting pulse wave in the preset reference information, and a number of the starting pulse wave is preset in the preset reference information; wherein, when the driver circuit decodes one of the pulse waves into the first message, the driver circuit determines whether or not the one of the pulse waves is the starting pulse wave based on the preset reference information.

9. The system according to claim 3, wherein the plurality of pulse waves of the pulse width modulation signal further include a stopping pulse wave, the order of the pulse waves including the stopping pulse wave in the pulse width modulation signal is preset in the preset reference information, a time point at which the stopping pulse wave appears is preset in the preset reference information, the second message is preset to be encoded into the stopping pulse wave in the preset reference information, and a number of the stopping pulse wave is preset in the preset reference information; wherein, when the driver circuit decodes one of the pulse waves into the second message, the driver circuit determines whether or not the one of the pulse waves is the stopping pulse wave based on the preset reference information.

10. The system according to claim 1, wherein the driver circuit adjusts a duty cycle of an initial feedback signal according to feedback information that the driver circuit is to transmit to the main controller, so as to output a feedback signal having a plurality of waveforms to the main controller; wherein, the main controller decodes each of the waveforms having a duty cycle that is equal to a first preset duty cycle or falls within a first preset duty cycle range into the first message based on the preset reference information, the main controller decodes each of the waveforms having a duty cycle that is equal to a second preset duty cycle or falls within a second preset duty cycle range into the second message, and the main controller arranges and combines all of the first messages and the second messages that are decoded from the waveforms according to an order of the waveforms in the feedback signal and time points at which the waveforms respectively appear, so as to obtain the feedback information.

11. The system according to claim 10, wherein the plurality of waveforms of the feedback signal include a plurality of preamble waveforms, the order of the plurality of waveforms including the preamble waveforms in the feedback signal is preset in the preset reference information, time points at which the preamble waveforms respectively appear are preset in the preset reference information, the first messages and/or the second messages are preset to be encoded into the preamble waveforms in the preset reference information, and a number of the preamble waveforms is preset in the preset reference information; wherein, based on the preset reference information, the driver circuit determines that the preamble waveforms appear in the feedback signal when the driver circuit determines that a number of the first messages and the second messages that are decoded from the waveforms being continually generated reaches a preamble number threshold.

12. The system according to claim 10, wherein the plurality of waveforms of the feedback signal include a plurality of motor state waveforms, the order of the plurality of waveforms including the motor state waveforms in the feedback signal is preset in the preset reference information, time points at which the motor state waveforms respectively appear are preset in the preset reference information, the first messages and/or the second messages are preset to be encoded into the preamble waveforms in the preset reference information, and a number of the preamble waveforms is preset in the preset reference information; wherein, the driver circuit determines which ones of the plurality of waveforms are the motor state waveforms based on the preset reference information, the driver circuit decodes each of the plurality of motor state waveforms into the first message or the second message, and the driver circuit generates motor state information included in the feedback information according to the first messages and/or the second messages that are decoded from the plurality of motor state waveforms.

13. The system according to claim 10, wherein the plurality of waveforms of the feedback signal include a parity waveform, the order of the plurality of waveforms including the parity waveform in the feedback signal is preset in the preset reference information, a time point at which the parity waveform appears is preset in the preset reference information, a number of the parity waveform is preset in the preset reference information, the first message is preset to represent an even parity checking instruction information in the preset reference information, the second message is preset to represent an odd parity checking instruction information in the preset reference information, and the driver circuit determines which one of the plurality of waveforms is the parity waveform based on the preset reference information; wherein the driver circuit determines that the parity waveform from which the first message is decoded indicates the even parity checking instruction information, and the driver circuit determines that the parity waveform from which the second message is decoded indicates the odd parity checking instruction information.

14. The system according to claim 10, wherein the plurality of waveforms of the feedback signal include a starting waveform, the order of the plurality of waveforms including the starting waveform in the feedback signal is preset in the preset reference information, a time point at which the starting waveform appears is preset in the preset reference information, the first message is preset to be encoded into the starting waveform in the preset reference information, a number of the starting waveform is preset in the preset reference information, and the driver circuit determines that the waveform from which the first message is decoded is the starting waveform based on the preset reference information.

15. The system according to claim 10, wherein the plurality of waveforms of the feedback signal include a stopping waveform, the order of the plurality of waveforms including the stopping waveform in the feedback signal is preset in the preset reference information, a time point at which the stopping waveform appears is preset in the preset reference information, the second message is preset to be encoded into the stopping waveform in the preset reference information, a number of the stopping waveform is preset in the preset reference information, and the driver circuit determines that the waveform from which the second message is decoded is the stopping waveform based on the preset reference information.

* * * * *